United States Patent
Castaldi et al.

(10) Patent No.: US 7,504,047 B2
(45) Date of Patent: *Mar. 17, 2009

(54) METHOD FOR IMPROVED SELECTIVITY (75) Inventors: Marco J. Castaldi, Yonkers, NY (US); Maxim Lyubovsky, North Haven, CT (US); Subir Roychoudhury, Madison, CT (US)

(73) Assignee: Precision Combustion, Inc., North Haven, CT (US)

( * ) Notice: Subject to any disclaimer, the term of this patent is extended or adjusted under 35 U.S.C. 154(b) by 916 days.

This patent is subject to a terminal disclaimer.

(21) Appl. No.: 10/832,055

(22) Filed: Apr. 26, 2004

(65) Prior Publication Data

US 2004/0258602 A1 Dec. 23, 2004

Related U.S. Application Data

(63) Continuation-in-part of application No. 10/095,884, filed on Mar. 12, 2002, now Pat. No. 6,746,657.

(51) Int. Cl.
*C01B 3/26* (2006.01)

(52) U.S. Cl. .................................................. 252/373

(58) Field of Classification Search ............... 252/373
See application file for complete search history.

(56) References Cited

U.S. PATENT DOCUMENTS

| | | | |
|---|---|---|---|
| 5,510,056 A | 4/1996 | Jacobs et al. | 252/373 |
| 5,648,582 A | 7/1997 | Schmidt | 585/652 |
| 6,254,807 B1 * | 7/2001 | Schmidt et al. | 252/373 |
| 6,361,896 B1 * | 3/2002 | Eberle et al. | 429/40 |
| 6,488,838 B1 * | 12/2002 | Tonkovich et al. | 208/108 |
| 7,097,787 B2 * | 8/2006 | Lewis et al. | 252/373 |
| 7,226,574 B2 * | 6/2007 | Long et al. | 423/650 |

* cited by examiner

*Primary Examiner*—Wayne Langel
(74) *Attorney, Agent, or Firm*—Robert L. Rispoli (57) ABSTRACT

The invention disclosed is a method for improving the selectivity of a desired chemical reaction over an undesired chemical reaction utilizing a reactor having at least one channel having a catalyst positioned thereon and a presenting a reactant flow stream at a known flow rate and inlet temperature over the catalyst at a velocity such that a boundary layer formed thereby relative to said catalytic surface defines a thickness that is sufficiently less than the thickness of a fully developed boundary layer over said catalytic surface whereby the desired chemical reaction occurs preferentially over the undesired chemical reaction.

1 Claim, 7 Drawing Sheets

METHOD FOR IMPROVED SELECTIVITY

CROSS-REFERENCE

This application is a continuation-in-part of U.S. patent application Ser. No. 10/095,884, filed Mar. 12, 2000 now U.S. Pat No. 6,746,657 incorporated herein by reference.

GOVERNMENT RIGHTS

This invention was made with government support under NSF Grant No. 0060771. The U.S. government has certain rights in this invention.

FIELD OF THE INVENTION

The present invention is generally directed to a chemical reaction supported by a catalyst, and particularly relates to the selectivity of a desired chemical reaction supported by a catalyst, and more specifically as exemplified by a method of converting carbon monoxide to carbon dioxide in the presence of hydrogen with reduced methanation.

BACKGROUND OF THE INVENTION

The selectivity of a desired chemical reaction is defined as the ratio of desired to both desired and undesired products made in the presence of a catalyst that may support both the desired and undesired chemical reactions. As such, improving selectivity to the desired product is of substantial value. For example, the elimination of, or reduction of carbon monoxide from a gas stream containing carbon monoxide, hydrogen and water vapor without significant consumption of hydrogen can be of value in numerous situations where the hydrogen will subsequently be used. One such example is in a fuel cell where hydrogen provides the fuel but carbon monoxide is a poison.

There are multiple fuel cell designs of which one is a Proton Exchange Membrane fuel cell (PEMFC). While the present invention finds utility with respect to PEMFC's, and such use is described herein, the present invention should not be considered to be limited in such regard. The present invention also finds utility in other applications where improved selectivity is desirable or, more fundamentally, where at least one chemical reaction is desired and at least one chemical reaction is undesired in the presence of a catalyst that may support both the desired and undesired chemical reactions.

A PEMFC includes an anode side and a cathode side separated by an electrolyte that acts as a membrane. On the anode side, hydrogen is introduced and each hydrogen molecule is split into two positively charged hydrogen ions and two electrons. Simultaneously on the cathode side, oxygen molecules are introduced and react with the positively charged hydrogen ions transported through the membrane. The electrolyte is treated to conduct only positively charged ions, pulling them through the electrolyte. The electrons released in the splitting of the hydrogen molecule are conducted through an anode on the anode side via an external circuit to a cathode on the cathode side where the hydrogen ions and oxygen combine to form water.

Hydrogen is the fuel used to operate a fuel cell and must be generated, e.g. concentrated or released from a molecule containing hydrogen, as hydrogen is not available in a natural form suitable for use as a fuel. One source of hydrogen is fossil fuel, such as gasoline, that is reformed to release the hydrogen contained therein. Gasoline is particularly desirable as a hydrogen source when the fuel cell is to be used as a power plant in a non-stationary item such as an automobile. A problem with obtaining hydrogen from gasoline, however, is that in the reformation process hydrogen is generated in combination with other gases such as carbon monoxide.

Carbon monoxide poisons the anode within a PEMFC potentially rendering the fuel cell less efficient or inoperative. Therefore, carbon monoxide must be removed from, or substantially reduced in, the gas stream containing the hydrogen prior to the gas stream being introduced into the PEMFC.

One method of reducing the carbon monoxide in a gas stream containing carbon monoxide (CO), hydrogen ($H_2$) and water vapor ($H_2O$) is to convert it to carbon dioxide ($CO_2$) and hydrogen using a catalyst (employing the water gas shift reaction $CO+H_2O=CO_2+H_2$). To accomplish this, low operational catalyst temperatures are preferred, since at high temperatures additional carbon dioxide can result in the net production of carbon monoxide. High operational catalyst temperatures, on the other hand, are problematic in that the hydrogen tends to combine with either the carbon monoxide, or carbon dioxide, if present, to form methane ($CH_4$) and water in a process referred to as methanation ($CO+3H_2=CH_4+H_2O$, or $CO_2+4H_2=CH_4+2H_2O$). For each molecule of methane formed by methanation, the available hydrogen for the fuel cell is reduced. It is, therefore, desirable to employ a method that reduces the concentration of carbon monoxide without simultaneously reducing the hydrogen present, or at least minimizing the consumption of hydrogen by the methanation process.

As is known to one skilled in the relevant art, the conversion of natural gas into a mixture of $H_2$ and CO, known as synthesis gas or syngas, is an important intermediate step in many existing and emerging energy conversion technologies. Currently, most syngas is produced by steam reforming of hydrocarbons such as methane. This endothermic reaction is generally represented by the following equation:

Methane is contacted with steam over a heated catalyst at high pressures and temperatures to produce a high hydrogen content syngas. However, steam reforming requires large heat exchange reactors, demanding large initial investment costs. Furthermore, stringent heat balance requirements in the steam reforming process make scaling these reactors to smaller sizes extremely difficult.

Alternatively, catalytic partial oxidation (CPOx) is a relatively inexpensive alternative for syngas generation. The CPOx process is generally represented by the following equation:

A hydrocarbon such as methane is reacted with oxygen over a catalyst bed to yield syngas with $H_2$ to CO molar ratio near 2. Examples of recent publications in this area are those of D. A. Hickman and L. D. Schmidt; AICHE Journal, 39 (1993) 1164 which discloses that near complete conversion of methane to mostly hydrogen and carbon monoxide could be achieved at reaction times as short as 1 millisecond thereby promising dramatic reduction in reactor size and complexity, as compared to existing syngas production technologies. However, to avoid the energy losses associated with the compression of hot, high hydrogen content gases, the CPOx reactor should be operated at pressures in the range of 0.5 to 4 MPa compatible with downstream processes.

Surprisingly, despite much interest over the last decade, only very limited work has been reported on high-pressure CPOx of methane and such work is not directly transferable to practical applications of a CPOx process. The properties of the catalytic systems discussed in the prior art promote liberating excessive amounts of heat when operating the CPOx process under elevated pressures, leading to overheating of the reactor. This problem in the prior art can be mitigated by enhancing the mass and heat transfer rates within the reactor. It is, therefore, desirable to employ a method that promotes steady operation of a CPOx reactor under the high-pressure conditions wherein the mass and heat transfer rates within the reactor are enhanced.

Based on the foregoing, it is an objective of the present invention to develop a method for improving the selectivity of a desired chemical reaction over an undesired chemical reaction, in the presence of a catalyst that may support both the desired and undesired chemical reactions. Another object of the present invention is to develop a method for the removal of carbon monoxide from a gas stream comprising carbon monoxide, hydrogen and water vapor wherein the consumption of hydrogen therein is minimized thereby resulting in a gas stream having a higher concentration of hydrogen than would otherwise be obtained. Another object of the present invention is to develop a method that promotes steady operation of a CPOx reactor under the high-pressure conditions wherein the mass and heat transfer rates within the reactor are enhanced. Another object of the present invention is to develop a method for the improved production of syngas.

SUMMARY OF THE INVENTION

The present invention is a method for improving the selectivity of a desired chemical reaction over an undesired chemical reaction in a catalytic reactor having at least one channel defined at least in part by a catalytic surface. The catalytic surface is suitable for supporting both the desired and undesired chemical reactions. A flow stream of reactants is passed through at least one channel at a flow rate such that a boundary layer formed over the catalytic surface has a thickness less than that of a fully developed boundary layer.

The present invention, in another aspect, is a method for the conversion of carbon monoxide to carbon dioxide in the presence of hydrogen with reduced methanation using a catalytic reactor having at least one channel defined at least in part by a catalytic surface. The catalytic surface is suitable for supporting a water gas shift reaction. At least a portion of the gas stream, which comprises carbon monoxide, hydrogen and water vapor, wherein the hydrogen is greater than or equal to five (5) times the carbon monoxide in terms of percent mole concentration, is then passed through at least one channel at a flow rate such that a boundary layer formed over the catalytic surface has a thickness less than that of a fully developed boundary layer.

The gas stream can have other constituents, such as oxygen and carbon dioxide. However if oxygen is present, it should be minimized as it will not only react with carbon monoxide to form carbon dioxide but also combine with the hydrogen to form water. The consumption of hydrogen by oxygen to form water is equally undesired as is the consumption of hydrogen by carbon to form methane, where it is desired that the output gas stream contain as much hydrogen as possible. The molar ratio of oxygen should be less than 5:1 to that of carbon monoxide to minimize hydrogen consumption.

If carbon dioxide is present in the entering gas stream, the surface temperature of the catalytic surface should be maintained below about 450 degrees C. If the surface temperature exceeds about 450 degrees C., the carbon dioxide will combine with the hydrogen to form methane. Preferably, the concentration of carbon dioxide should not exceed a maximum amount, e.g. 25% at about 450 degrees C., which includes carbon dioxide created from the carbon monoxide.

The molar ratio of carbon monoxide to water within the gas stream is based on reaction stoichiometry. If it is the intent to convert all the carbon monoxide (CO) to hydrogen ($H_2$), there needs to be at least an equimolar concentration of water to carbon monoxide. Therefore, it is preferred that the water to carbon monoxide ratio be greater than 1.0.

The invention relies on a controlling the thickness of the boundary layer within the fluid in the channel in the area of the catalyst such that the thickness of the boundary layer is less than the thickness of a fully-developed boundary layer. More specifically, a boundary layer is a region within a fluid flowing near a surface where the velocity of the fluid is less than the main bulk flow velocity. A boundary layer results from the viscous effects of the surface of the channel. These viscous effects are reduced the further the fluid is away from the surface, thus there is a velocity gradient within the fluid.

In a smooth channel of infinite length, the boundary layer begins at the entrance to the channel and increases to a fully-developed boundary layer at some penetration distance from the entrance. The penetration distance required to achieve a fully developed boundary layer is dependent upon the entering velocity and viscosity of the fluid. All boundary layers have a thickness, with the maximum thickness occurring when the boundary layer is fully-developed.

The thickness of the boundary layer can be maintained below the maximum thickness by assuring that the length of the channel is shorter than the penetration distance required to achieve a fully developed boundary layer. Alternatively, the thickness of the boundary layer can also be maintained below the maximum thickness in a channel having a length greater than the penetration distance by the use of flow disruption devices such as trip strips.

Based on flat plate geometry the velocity profile can be calculated using the equation:

$$V_x = U_\infty \mathrm{erf}\left(\frac{1}{2} z \sqrt{\frac{U_\infty}{xv}}\right)$$

where:
$V_x$=the velocity in the channel in the x-direction
$U_\infty$=the free stream velocity
z=distance from the surface (perpendicular)
x=the penetration into the channel
v=viscosity As gases tend to have generally equal viscosity's, a fully developed boundary layer has a maximum thickness of about 0.03 inches for a given bulk velocity, temperature, pressure and viscosity. As those skilled in fluid mechanics will appreciate, as the viscosity of the fluid increases the maximum thickness for a fully developed boundary layer decreases.

The catalyst comprises at least one platinum group metal, which is defined as a group of transition metals that includes osmium, rhodium, iridium, palladium, and platinum, or gold. The invention should not be considered limited to the elemental forms of the platinum group metals, and gold as other forms such as molecules containing the platinum group metal could be used, such as oxides. The catalyst may be mixed with, or supported on, other substances such as alumina in any phase, or silica. The catalyst may also be stabilized, such as by the use of lanthanum.

DETAILED DESCRIPTION OF THE INVENTION

Figure 1:
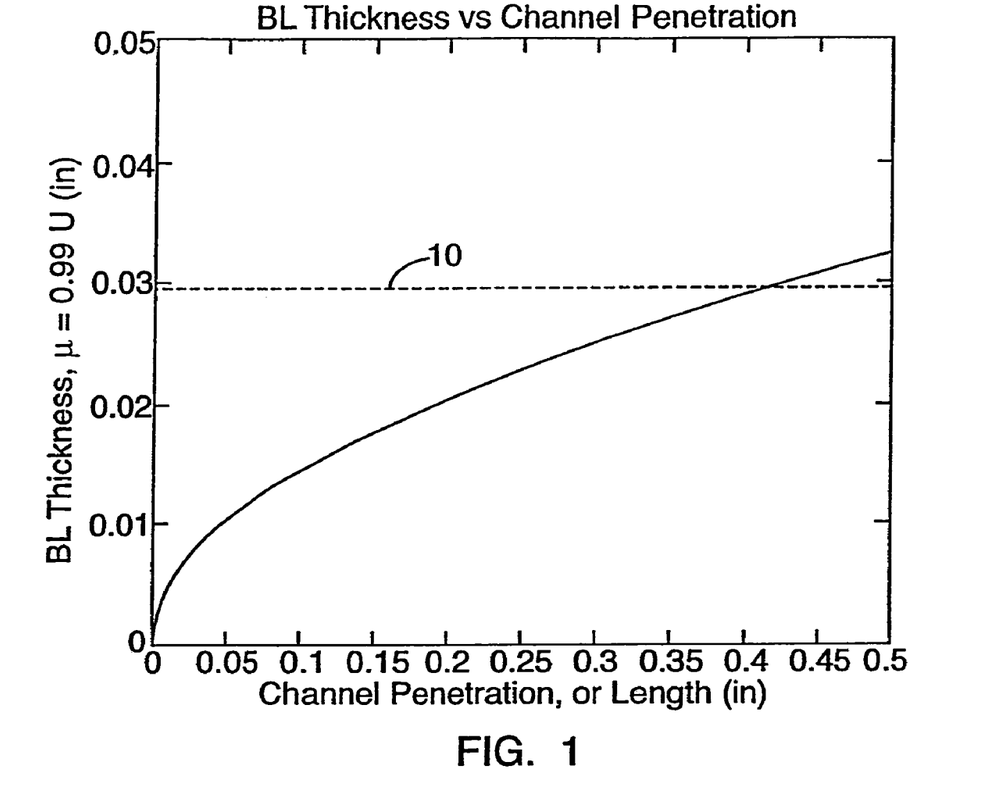
FIG. 1 is a plot of Channel Penetration v. Boundary Layer Thickness.

As generally shown in FIG. 1, a fluid flowing over a surface creates a boundary layer having a momentum thickness, i.e. BL Thickness. As the channel penetration distance increases, the thickness of the boundary layer tends to increase to an asymptotic point 10 that is the maximum thickness of the boundary layer. In the case of the present invention wherein a gas is used and of which this graph is representative, the asymptotic point occurs at a boundary layer thickness of about 0.03 inches that corresponds to a channel penetration of about 0.45 inches. A gas flowing in a channel having a channel length shorter than 0.45 inches, or a channel having a length longer than 0.45 inches incorporating properly positioned flow disruption features, will therefore never develop a boundary layer having the maximum thickness. On the other hand, fluids flowing in channels having channel lengths longer than 0.45 inches without appropriately positioned flow disruption features will develop a boundary layer having the maximum thickness.

Figure 2:
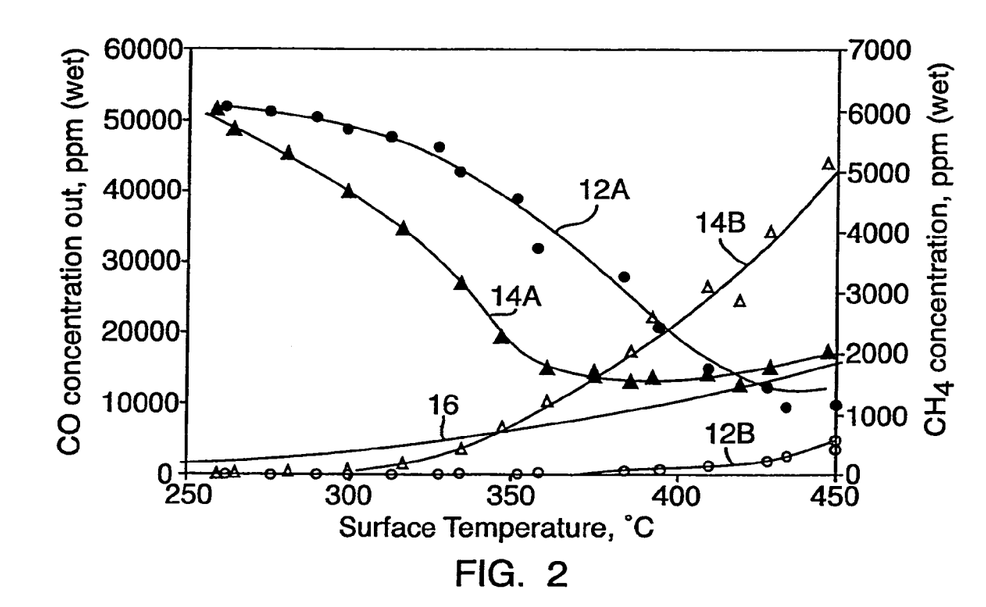
FIG. 2 is a plot of Surface Temperature versus CO Concentration and $CH_4$ Concentration out for two similar Water Gas Shift reactors, one operating in accordance with the present invention and one operating outside of the method of the present invention.

FIG. 2 shows the results of an experiment comparing two similar reactors operating at similar conditions but having different channel lengths. More specifically, one catalytic reactor utilizes a plurality of stacked short-channel substrates, i.e. channel length of each substrate being based on whether the fluid flow therethrough would develop a boundary layer having a thickness less than the maximum thickness, referred to as a short-channel reactor, and the other utilizes a long channel substrate, i.e. channels have a length greater than or equal to that required to allow for development by the fluid flowing therethrough of a boundary layer having the maximum thickness, more commonly referred to as a monolith.

The experiment was designed to compare the same size reactor using the same total flow rate with the same inlet species compositions and the same temperature scan range and rate. Each reactor utilized substrates having 400 cells per inch. The length of the channels of the short-channel substrates of the short-channel reactor was 0.008 inches and of the monolith was 0.5 inches. The short-channel substrate was made of metal, i.e. HAYNES 230, and the monolith was ceramic. There were 50 stacked short-channel substrates in the short-channel reactor and one monolith in the monolith reactor. The short-channel substrates were stacked front to back into a bed with channels of the adjacent substrates being non-aligned.

The catalyst formulation and amount within each reactor was controlled so that each reactor would have equivalent specific surface area and dispersion. The monolith was made from a one-half inch deep, 400-cells per inch ceramic monolith cut into an approximately $15/16^{th}$ inch diameter cylinder. After weighing, the monolith was immersed in a gamma alumina washcoat slurry and removed, with excess washcoat was removed using compressed air. The monolith was then placed in a muffle furnace, preheated to 500 degrees C., for one hour, and then taken out and cooled in air. The monolith was weighed again and the loading of washcoat determined based on the increased weight. The monolith was then immersed in a 0.20 molal lanthanum nitrate solution, with the excess solution removed using compressed air. The monolith was then calcined in an oven preheated at 900 degrees C. for five hours. The loading of the lanthanum, as lanthanum oxide, was calculated. The alumina loading was 0.6245 grams and the loading of lanthanum was 0.1244 grams. The monolith was then dipped into a five percent tetraamine platinum nitrate solution and calcined in a preheated oven at 500 degree C. for 21 hours. This step was repeated until the loading of platinum on the monolith was 0.1967 grams. This process resulted in a monolith having a total stabilized alumina slipcoat loading of 0.7489 grams and platinum loading of 0.1967 grams.

The short-channel substrates were prepared as follows. An expanded metal strip having 400 cells per inch was oxidized at 1100 degrees C. for one hour. The strip was then coated with gamma alumina washcoat by immersion to yield a 20 $mg/in^2$ weight gain of alumina. The strip was then calcined in a preheated muffle furnace at 500 degrees C. for one hour. The strip was then coated with a 0.21 molal lanthanum nitrate solution to yield a 3.65 $mg/in^2$ loading of lanthanum. The strip was then calcined in a preheated muffle furnace at 900 degrees C. for five hours. Platinum, from a five percent tetraamine platinum nitrate solution, was then applied to the strip. The strip was then calcined in a preheated oven at 500 degrees C. for one hour. The platinum application procedure produced a strip with a 5.4 $mg/in^2$ loading of platinum. A reactor having 50 strips was constructed. The resulting reactor contained a total stabilized aluminum slip coat loading of 0.8162 grams, and a platinum loading of 0.1864 grams.

The gas stream entering the reactor comprised carbon monoxide, hydrogen and water vapor. More specifically, the gas stream had the following mole ratios: $H_2$—27.4%; $CO_2$—9.6%; CO—5.7%; and $H_2O$ 32.8%. The balance of the gas stream was $N_2$ and inevitable impurities. The Equilibrium CO Concentration, shown in FIG. 2, was calculated via Stanjan calculation, which is a minimization of the Gibbs free energy between reactants and products.

The gas stream was preheated so that the reaction occurring when the gas stream contacted the catalyst would produce a range of surface temperatures from about 250 degrees C. to 450 degrees C. The flow rate was set and each reactor sized to give a space velocity, i.e. the volumetric flow rate divided by the volume, of 110,000 $hr^{-1}$. During testing, all influential conditions were held constant as well as temperature scan and gas sample rates. The above manufacturing procedure and the testing conditions resulted in side by side tests that were comparable as to the results obtained.

In FIG. 2 the performance of the short-channel reactor is generally depicted by the line 12 where line 12A shows the carbon monoxide (CO) concentration out and line 12B shows the methane ($CH_4$) concentration out. The performance of the monolith reactor is similarly depicted by the line 14 which also has 14A and 14B parts consistent with the 12A and 12B parts.

As can readily be observed, the lines 12A and 14A begin to diverge at about a surface temperature of 300 degrees C. As should readily be appreciated, the divergence results from the fact that the hydrogen within the gas stream passing through the short-channel reactor is not being combined with the carbon within the carbon monoxide, or carbon dioxide to form methane. Thus, the gas stream out of the short-channel reactor is relatively richer in hydrogen than the gas stream out of the monolith reactor.

The thickness of the boundary layer can be adjusted to alter the selectivity to hydrogen. Calculations indicate that a thickness no greater than 0.01 inches, 33% of the maximum thickness (0.01/0.03), will result in a 1,000 ppm methane concentration, while a thickness no greater than $9 \times 10^{-7}$ inches, .0.003% of the maximum thickness, will result in a methane concentration of 1 ppm. The experiment above used a thickness no greater than 0.005 inches, or 17% of the maximum thickness, giving a 400 ppm methane result.

The real comparison, however, is at a surface temperature of about 400 degrees C. where both reactors achieve equilibrium carbon monoxide conversion(denoted by line 16), but the short-channel reactor is consuming approximately $\frac{1}{20}^{th}$ the amount of hydrogen. As those skilled in the art of reactor design will appreciate, there is a tradeoff between surface temperature and space velocity such that a reduction in space velocity will cause an increase in surface temperature. Therefore, the term "about" as used with an identified surface temperature is meant to recognize this known tradeoff.

In a subsequent experiment, it was determined that for a short-channel reactor, the amount of methanation could be halved by doubling the space velocity without affecting the temperature at which CO equilibrium is achieved.

In another embodiment of the invention, the production of syngas is improved. In accordance with the method of the present invention, a robust, steady-state, methane CPOx reactor was operated at pressures up to 0.8 MPa. The reactor comprises a series of discrete, metallic screen substrates coated with a high surface area ceramic washcoat and impregnated with Rhodium. A characteristic feature of these substrates is the short length of each element which prevents development of a boundary layer over the catalytic surface greatly enhancing heat and mass transfer coefficients for the system. These feature makes these substrates perfectly suited for short contact time oxidation reactions.

The CPOx reactor according to the present invention was assembled by stacking catalyzed screens with gas sample probes and thermocouples inserted between the screens at several locations along the length of the reactor. The total length of the reactor was 2 cm. The diameter of the gas flow passage zone in the reactor was 20 mm, such that the volume of the catalyst bed was 6.3 $cm^3$. In all data reported herein, the flow rates of methane and air were increased proportionally to the operating pressure, in order to maintain constant linear flow velocity and residence time. In the experiment at P=0.8 MPa, methane was fed into the reactor at a rate of 160 standard liters per minute (SLPM) (approximately 0.11 mole $CH_4$ per sec), which is equivalent to 88 $kW_t$ of thermal power input. Normalized to the reactor volume, this equals approximately 14 $MW_t$/L power density in the CPOx reactor.

Figure 3:
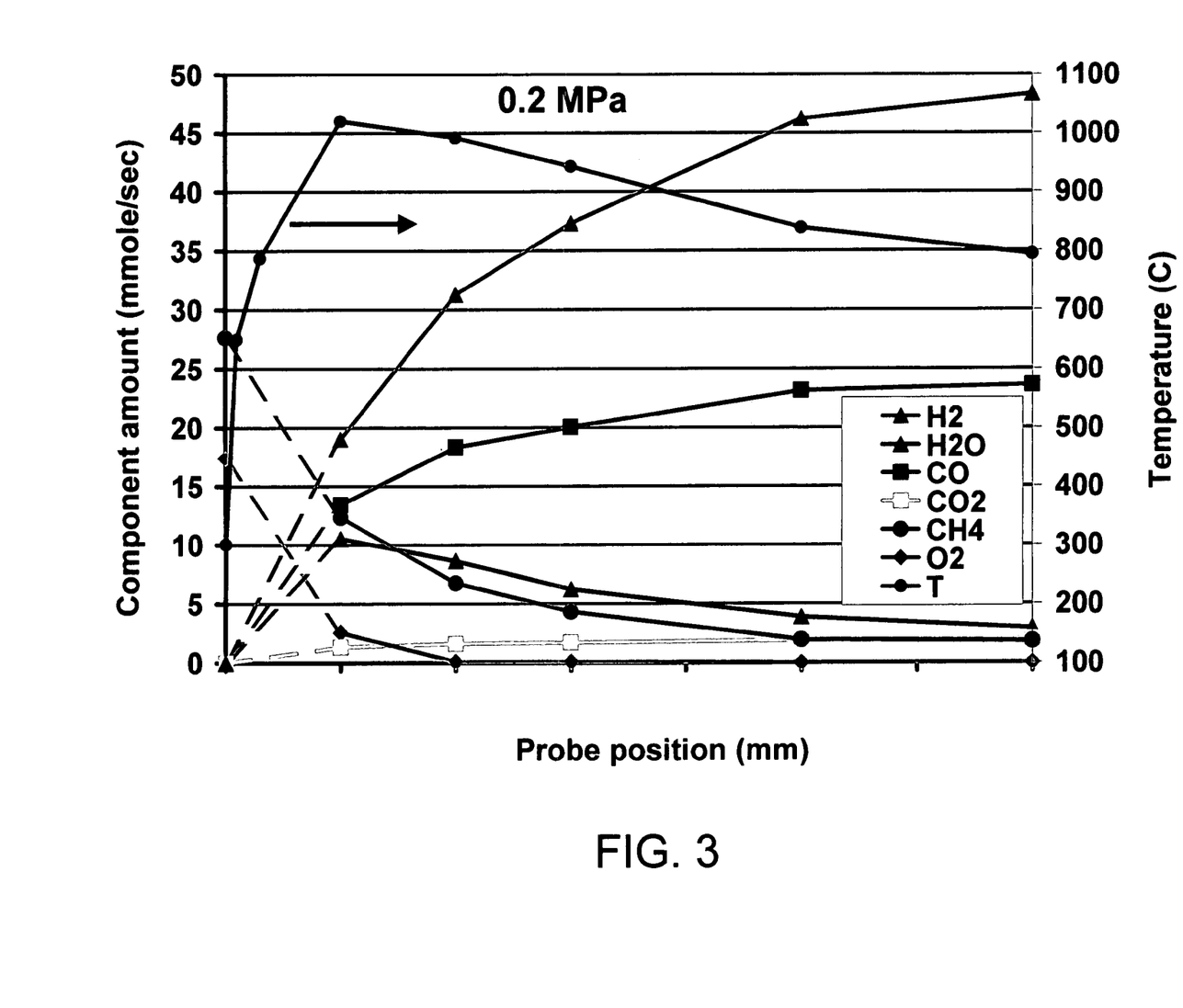
FIG. 3 is a plot of Concentration and Temperature profiles along the length of a catalyst bed of a CPOx reactor operating in accordance with the present invention at a pressure of 0.2 MPa.
Figure 4:
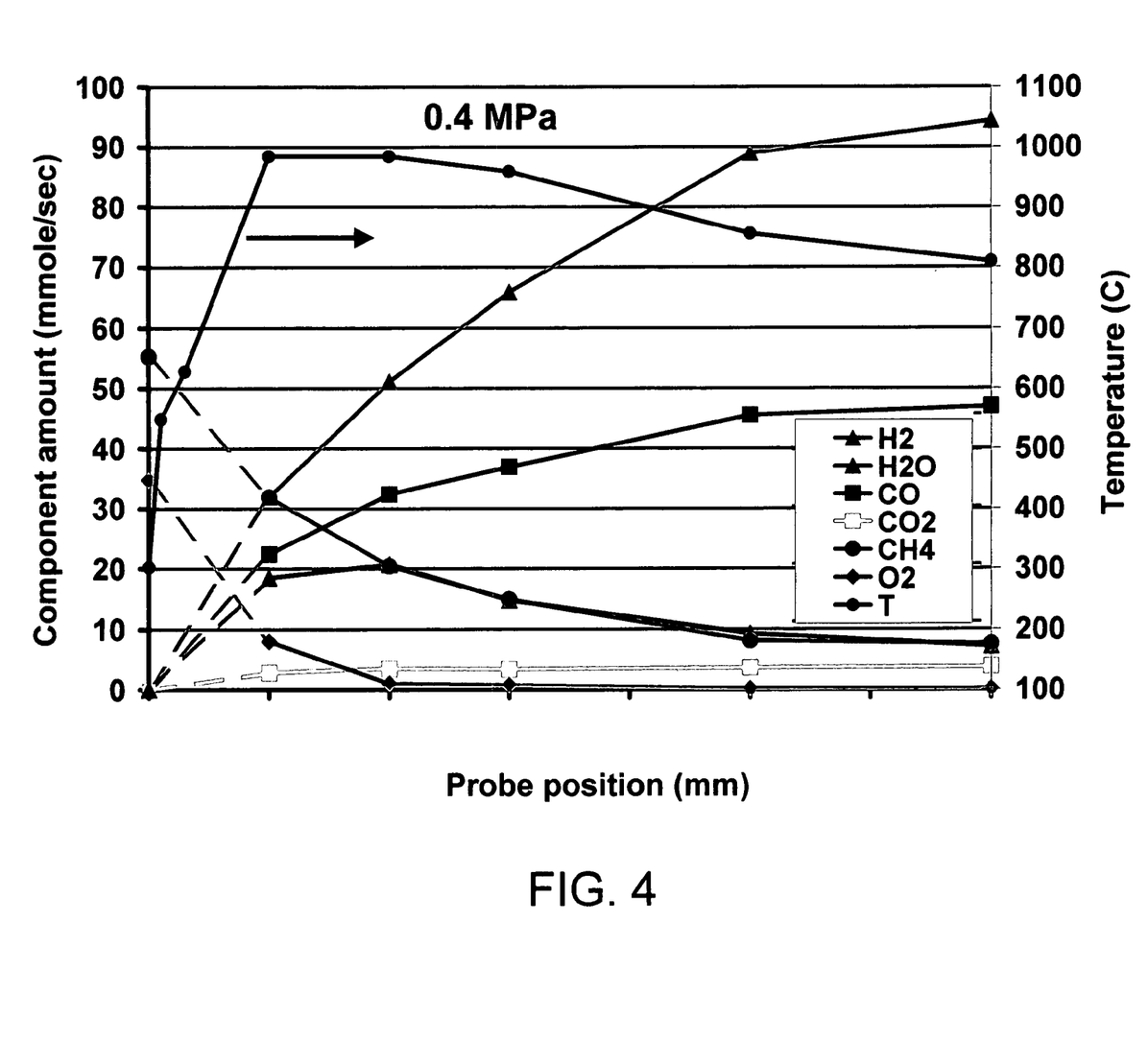
FIG. 4 is a plot of Concentration and Temperature profiles along the length of a catalyst bed of a CPOx reactor operating in accordance with the present invention at a pressure of 0.4 MPa.
Figure 5:
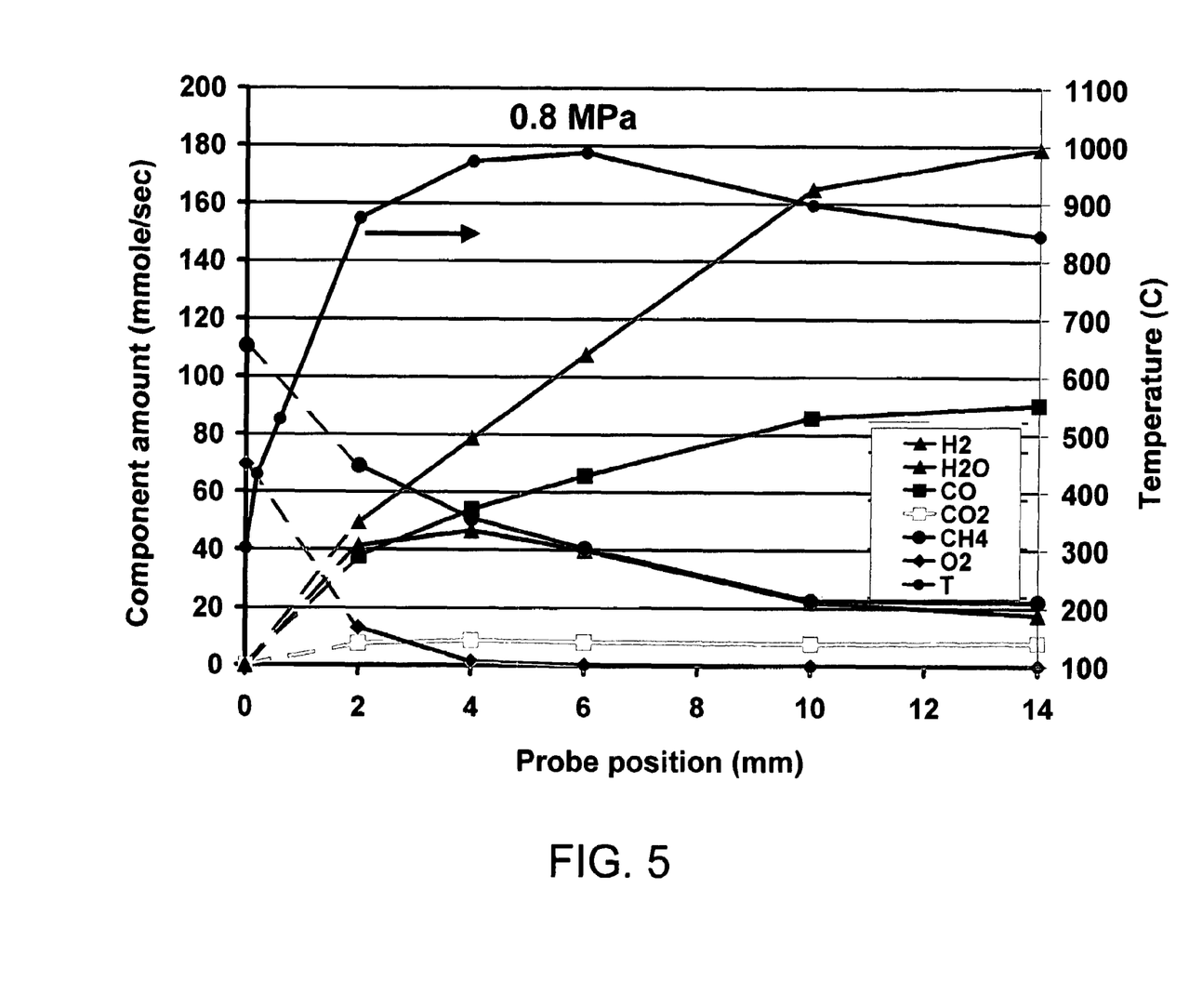
FIG. 5 is a plot of Concentration and Temperature profiles along the length of a catalyst bed of a CPOx reactor operating in accordance with the present invention at a pressure of 0.8 MPa.

As shown in FIGS. 3-5, gas composition and temperature profiles measured along the length of the catalyst bed demonstrate that, in spite of very short contact time, the CPOx process does not occur in a single reaction but consists of sequential oxidation and reforming steps. FIG. 3, FIG. 4 and FIG. 5 depict species concentration and temperature profiles along the length of the catalyst bed of a reactor of the present invention at pressures of 0.2, 0.4 and 0.8 MPa, respectively, and a O:C=1.2. A concentration of $N_2$ in the sample was used to convert species concentrations into the flow rate units (mmole/sec) based on the known rate of air supply to the reactor inlet and assuming that nitrogen remains inert under the reaction conditions. Values at the x=0 position are obtained of the inlet methane and air flow as measured by mass flow meters. While $O_2$:$CH_4$=0.6 in the feed stream, oxygen is consumed at a rate up to 1.34 times higher than methane at the front of the reactor. This stoichiometry suggests that simultaneous complete and partial oxidation reactions occur at the onset of the CPOx process. For the partial oxidation reaction ($CH_4 + \frac{1}{2}O_2 \rightarrow CO + 2\ H_2$; $\Delta H=-38$ kj/mole), the $O_2$:$CH_4$ consumption ratio equals 0.5. In comparison, for the complete oxidation, ($CH_4 + 2\ O_2 \rightarrow CO_2 + 2\ H_2O$; $\Delta H=-802$ kj/mole), the $O_2$:$CH_4$ consumption ratio equals 2.

Under all operating pressures run, essentially all the oxygen was consumed before traveling approximately 4 mm into the catalyst bed (corresponding residence time of approximately 0.5 msec), at which point methane conversion selectivity measured between 55% and 75%. At constant inlet flow velocity, the reaction rate linearly increased with pressure between 0.2 and 0.8 MPa. For multi-step processes, such as partial oxidation, first order dependence of the kinetic rate on pressure is unlikely. Scaling of the reaction rate with pressure, therefore, suggests that the CPOx process rate is limited by the transport of oxygen—the limiting reactant—across the boundary layer to the surface of the catalyst.

Figure 6:
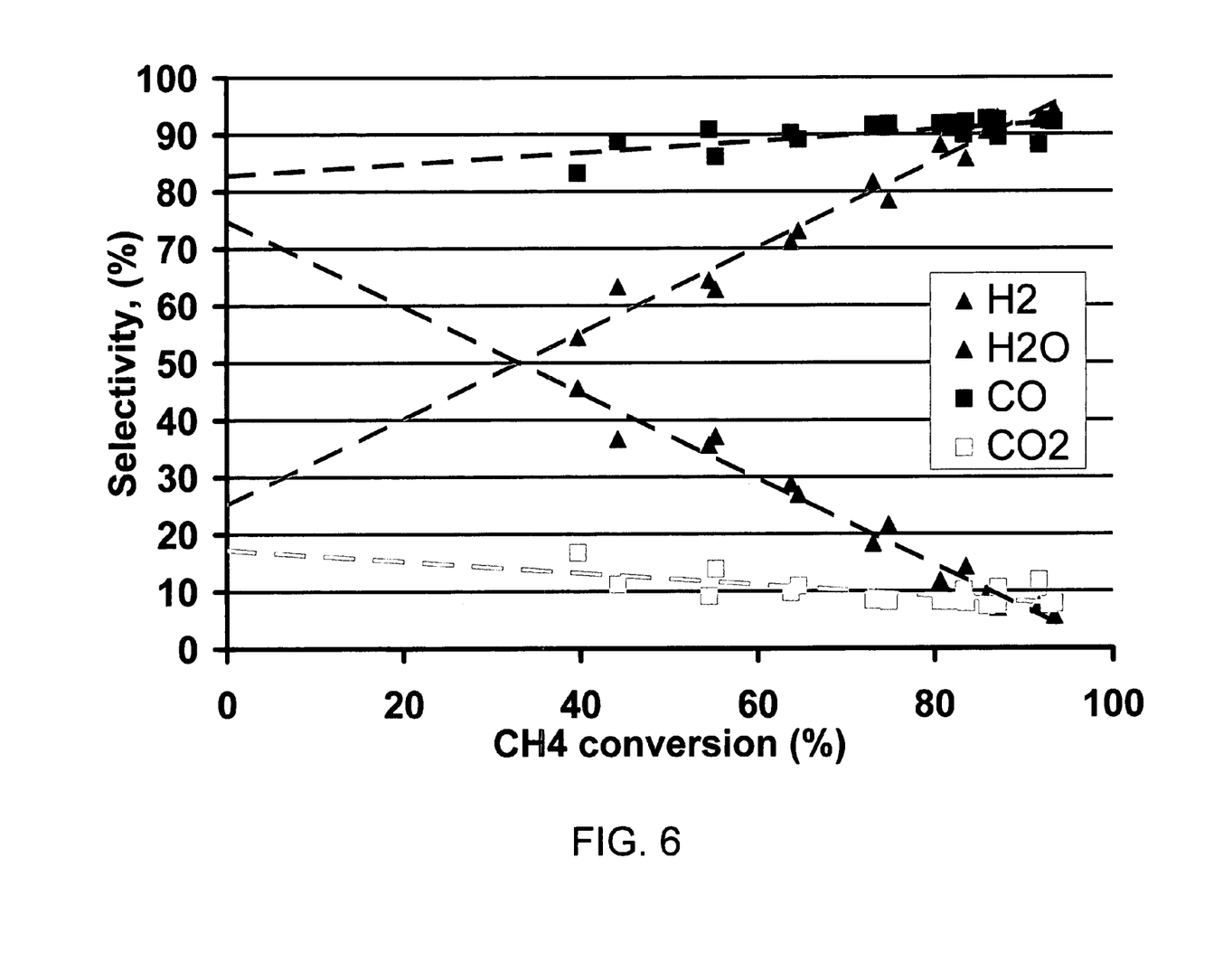
FIG. 6 is a plot of Selectivity, as a percentage to complete and partial oxidation products, as a function of methane conversion by CPOx. The depicted result was calculated based on the species concentrations shown in FIG. 1 for all tested conditions.

In a CPOx reactor of the present invention, much more water than $CO_2$ was formed at the front of the reactor. This result is consistent with the indirect pathway for the CPOx process, in which complete oxidation of methane on the front of the reactor is followed by reforming reactions. In comparison, low and near constant concentration of $CO_2$ along the reactor is consistent with a direct partial oxidation pathway in which partial oxidation products directly form on the front of the reactor. In FIG. 6, the selectivity to complete and partial oxidation products is depicted as a function of methane conversion. The selectivity was calculated based on the species concentrations shown in FIGS. 3-5. As shown in FIG. 6, linear extrapolation of product selectivity plots to zero methane conversion suggests the following initial reaction:

$CH_4 + 1.34\ O_2 \rightarrow 0.82\ CO + 0.18\ CO_2 + 0.5\ H_2 + 1.5\ H_2O$;
($\Delta H = -449$ kj/mole).

Therefore, CO is directly produced with high selectivity on the oxidation step at the onset of the CPOx process. Selectivity for direct production of $H_2$ is low, such that high $H_2$ selectivity of the CPOx process is mainly due to the steam reforming reaction.

Figure 7:
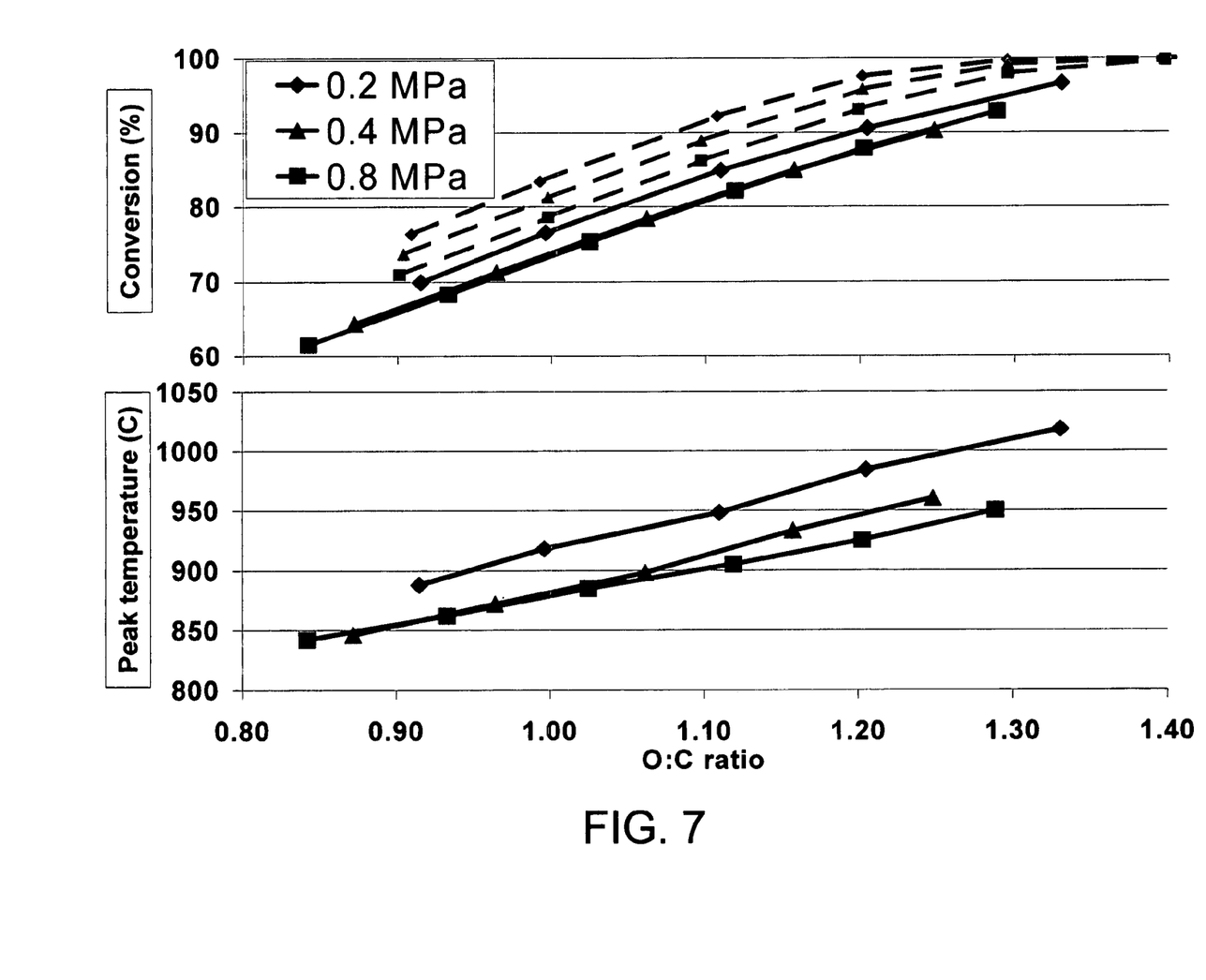
FIG. 7 is a plot depicting the dependence of methane conversion, as a percentage, and peak temperature reading as a function of the air added to the reactor.

Before oxygen is consumed from the gas phase on the front of the reactor, homogeneous oxidation reactions may take place. In these non-selective free radical reactions, methane, hydrogen and carbon monoxide can be oxidized to $CO_2$ and $H_2O$ thereby decreasing the selectivity of the CPOx process and increasing the peak temperature. As depicted in FIG. 7, a single line representative of all data points collected in operating conditions comprising a four-fold difference in the operating pressure demonstrates that in the operating pressure interval, the gas phase reactions were insignificant. FIG. 7 illustrates the dependence of methane conversion and peak temperature reading on the amount of air added to the reactor. The depicted conversion rates were measured under the following constant methane flow conditions: 40 SLPM at 0.2 MPa; 80 SLPM at 0.4 MPa and 160 SLPM at 0.8 MPa. Air flow was increased stepwise to increase the O:C ratio, and the dotted lines show the thermodynamic prediction for methane conversion in an adiabatic process under these inlet conditions. As shown in FIG. 7, the excellent transport properties of the reactor substrate of the present invention ensure a high rate of the mass-transfer-limited surface reactions and free radical quenching, such that high selectivity to partial oxidation products can be achieved even under high operating pressure. In addition, peak temperature decreased slightly when the process pressure was increased from 0.2 to 0.4 and to 0.8 MPa.

Under all operating conditions employed, methane conversion increased linearly with increasing O:C ratio. The decrease in the peak temperature with pressure compensated for decreasing methane conversion by enabling the operation of the reactor at a higher O:C ratio, such that conversion above 90% could be reached even at P=0.8 MPa. This shows the likelihood of successful operation of the CPOx process at even higher pressures.

While the present invention has been described in considerable detail with reference to improving the selectivity of the water gas shift reaction and the operation of a robust, steady-state, methane CPOx reactor, other reactions where the selectivity of a desired catalytic reaction product can be enhanced are contemplated. Therefore, the spirit and scope of the invention should not be limited to the description of the preferred embodiments described herein.

What is claimed is:

1. A method for improving the selectivity of a conversion of a hydrocarbon to $H_2$ and CO by catalytic partial oxidation comprising the steps of:
    a) providing a catalytic reactor having at least one channel defined at least in part by a catalytic surface suitable for supporting the conversion of the hydrocarbon primarily to that of $H_2$ and CO by catalytic partial oxidation; and
    b) presenting a reactant flow stream comprising the hydrocarbon and oxygen at a known flow rate and inlet temperature to the at least one channel at a velocity such that a boundary layer formed thereby relative to the catalytic surface defines a thickness that is less than a fully developed boundary layer thickness over the catalytic surface and maintaining the thickness of the boundary layer at a thickness less than a fully developed boundary layer thickness over the entire catalytic surface, so as to support thereby supporting the conversion of the hydrocarbon to $H_2$ and CO by catalytic partial oxidation.

* * * * *